(12) United States Patent
Choi

(10) Patent No.: US 9,906,257 B2
(45) Date of Patent: Feb. 27, 2018

(54) CASE FOR ELECTRONIC DEVICE, ELECTRONIC DEVICE USING THE SAME, AND NOTIFICATION METHOD THEREOF

(71) Applicant: Samsung Electronics Co., Ltd., Suwon-si (KR)

(72) Inventor: Seungmin Choi, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 30 days.

(21) Appl. No.: 15/011,195

(22) Filed: Jan. 29, 2016

(65) Prior Publication Data
US 2016/0226547 A1 Aug. 4, 2016

(30) Foreign Application Priority Data
Feb. 3, 2015 (KR) .................. 10-2015-0016845

(51) Int. Cl.
*H04W 74/00* (2009.01)
*H04B 1/3888* (2015.01)

(52) U.S. Cl.
CPC .................. *H04B 1/3888* (2013.01)

(58) Field of Classification Search
CPC .. G02B 6/0055; G02B 6/0088; G02B 6/0028; G02B 6/0073; G02B 6/0011; G02B 6/0018; G02B 6/002; G02B 6/0076

USPC .............. 455/567, 566, 575.8, 557
See application file for complete search history.

(56) References Cited

U.S. PATENT DOCUMENTS

| | | | |
|---|---|---|---|
| 8,657,457 B2 | 2/2014 | Doi et al. | |
| 2007/0075965 A1* | 4/2007 | Huppi | H04M 1/72563 345/156 |
| 2009/0003014 A1* | 1/2009 | Jablonski | A43B 1/0036 362/602 |
| 2010/0128494 A1 | 5/2010 | Moon et al. | |

FOREIGN PATENT DOCUMENTS

KR 2010-0059498 6/2010

* cited by examiner

*Primary Examiner* — Tu X Nguyen
(74) *Attorney, Agent, or Firm* — McAndrews, Held & Malloy, Ltd.

(57) ABSTRACT

Disclosed are a case for an electronic device, an electronic device including the case, and a notification method thereof. The case for the electronic device having a lateral side, a back side, and a display configured to emit light may include: a body that is fastened to the electronic device; and a light guide unit that is formed in the body, and guides the light emitted from the display of the electronic device to at least one of the lateral side or the back side of the electronic device to be output to the outside.

18 Claims, 16 Drawing Sheets

CASE FOR ELECTRONIC DEVICE, ELECTRONIC DEVICE USING THE SAME, AND NOTIFICATION METHOD THEREOF

RELATED APPLICATION(S)

This application claims priority from and the benefit under 35 U.S.C. § 119(a) of Korean Patent Application No. 10-2015-0016845, filed on Feb. 3, 2015, which is hereby incorporated by reference for all purposes as if fully set forth herein.

BACKGROUND

Various embodiments of the present disclosure relate to a case for an electronic device, an electronic device using the case, and a notification method thereof.

Recently, the dissemination and use of electronic devices (e.g., mobile communication terminals) has rapidly increased due to the remarkable development of information and communication technology and semiconductor technology. Accordingly, the electronic devices are necessities for modern people, and provide various functions desired by users. For example, the mobile communication terminal provides various functions, such as phone-calling, photographing images or movies, receiving broadcasts, connecting to the Internet, or recording.

In addition, the electronic device may receive a variety of information. For example, the electronic device may receive text messages, e-mails, call requests, advertisement messages, or the like. The electronic device may visually notify the user of the reception of a variety of information. For example, the electronic device may display icons or pop-up windows on the display in order to thereby notify the user of the receipt of the information.

Meanwhile the user may not check the received information in real time. Therefore, the electronic device may notify the user of the presence of the information that has not been checked by the user (hereinafter, "unidentified information") through a separate light-emitting diodes (e.g., LEDs).

SUMMARY

In general, the light-emitting device is positioned on the front side of the electronic device, on which a display is provided. Since the light-emitting device is provided on the front side of the electronic device, if the front side of the electronic device is blocked (e.g., when the electronic device is placed upside down on the table), the user may not notice the light-emitting of the light-emitting device. That is, when the front side of the conventional electronic device is blocked, the user cannot recognize the visual notification of the electronic device, which notifies of the receipt of the information or the presence of the unidentified information.

In addition, in recent years, various cases for protecting the electronic devices have been introduced. In other words, in the case of the electronic devices that are fastened to the cases, when the front side of the electronic device is blocked by the flip cover of the case or when the electronic device is placed upside down, the user cannot recognize the visual notification of the electronic device.

Various embodiments of the present disclosure provide a case for an electronic device, an electronic device using the same, and a notification method thereof, which can notify the user of the occurrence of various events or the presence of the unidentified information through at least one of the lateral side or the back side of the electronic device even when the front side of the electronic device is blocked.

In accordance with an aspect of the present disclosure, a case for an electronic device having a lateral side, a back side, and a display to emit light may include: a body that is fastened to the electronic device; and a light guide unit that is formed in the body, and guides the light emitted from the display of the electronic device to at least one of the lateral side or the back side of the electronic device to be output to the outside.

In accordance with another aspect of the present disclosure, an electronic device may include: a display; a sensor unit that includes one or more sensors to check a status of the electronic device; a controller that, when an event is detected, determines whether or not a front-side notification of the electronic device is viable by using the sensor unit, and if a front-side notification is unviable, activates at least a portion of the display to emit light; and a light guide unit that guides the light emitted from the portion of the display that has been activated to at least one of the lateral side or the back side of the electronic device to be output to the outside.

In accordance with another aspect of the present disclosure, a notification method of an electronic device that a) has 1) a lateral side, 2) a back side, and 3) a display configured to emit light, and b) is fastened to a case that has a light guide unit may include: when an event is detected, determining whether or not a front-side notification of the electronic device is viable; and if a front-side notification is unviable, activating at least a portion of the display, wherein the light emitted from the portion of the display that has been activated is guided to at least one of the lateral side or the back side of the electronic device through the light guide unit to then be output to the outside.

Various embodiments of the present disclosure can visually notify the user of the occurrence of the event through at least one of the lateral side or the back side in the case where the user cannot recognize the visual notification on the occurrence of the event through the front side of the electronic device (e.g., when the front side of the electronic device is blocked). Accordingly, various embodiments of the present disclosure can visually notify the user of the occurrence of the event in a variety of situations.

In addition, since the electronic device, according to various embodiments of the present disclosure, does not adopt a separate notification unit for notifying of the occurrence of the event, the manufacturing cost of the electronic device can be reduced.

BRIEF DESCRIPTION OF THE DRAWINGS

The above and other objects, features, and advantages of the present disclosure will be more apparent from the following detailed description in conjunction with the accompanying drawings, in which.

DETAILED DESCRIPTION

Figure 1A:
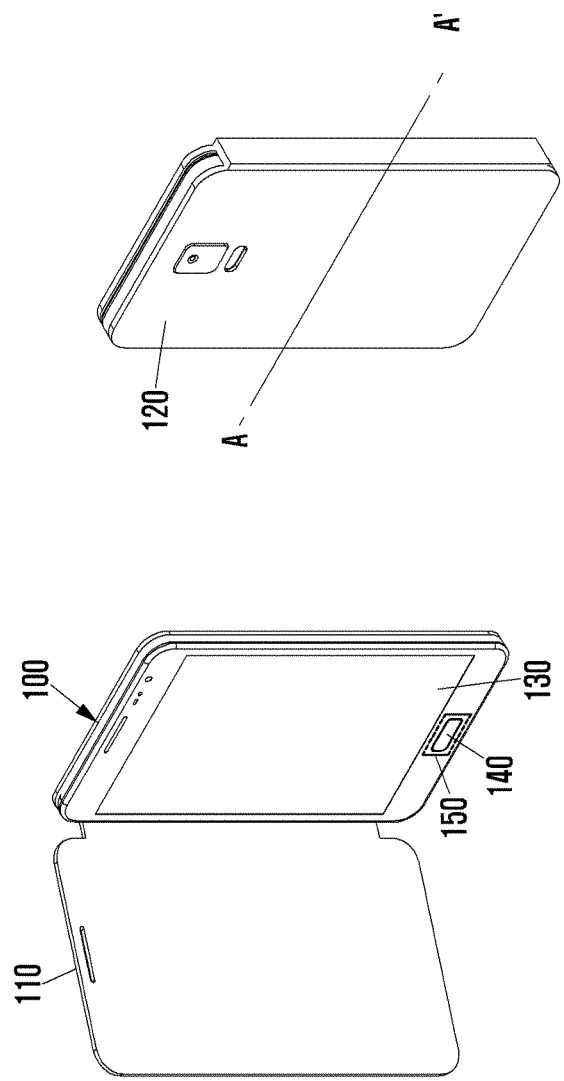
FIG. 1A illustrates an electronic device, according to an embodiment of the present disclosure.

Hereinafter, various embodiments of the present disclosure will be described with reference to the accompanying drawings. Specific embodiments are shown in the drawings and the relevant detailed descriptions are given in corresponding sections, but there is no intention to limit various embodiments of the present disclosure to the particular forms disclosed herein. For example, the present disclosure may have various embodiments while modifications and changes may be made therein. Various embodiments of the present disclosure should be construed to cover all modifications, equivalents, and/or alternatives falling within the spirit and scope of the present disclosure.

In the description of the drawings, identical or similar reference numerals are used to designate identical or similar elements.

As used in various embodiments of the present disclosure, the expressions "include", "may include" and other conjugates refer to the existence of a corresponding disclosed function, operation, or constituent element, and do not limit one or more additional functions, operations, or constituent elements.

Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

The term "or" used in various embodiments of the present disclosure includes any or all of combinations of listed words. For example, the expression "A or B" may include A, may include B, or may include both A and B.

The expressions such as "first", "second", or the like used in various embodiments of the present disclosure may modify various component elements in the various embodiments but may not limit corresponding component elements. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms as used in embodiments of the present disclosure are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD) such as electronic glasses, electronic clothes, an electronic bracelet, an electronic necklace, an electronic appcessory, electronic tattoos, or a smartwatch).

According to some embodiments, the electronic device may be a smart home appliance. For example, the smart home appliance may include at least one of a television, a Digital Video Disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device according to various embodiments of the present disclosure will be described with reference to the accompanying drawings. The term "user" as used in various embodiments of the present disclosure may refer to a person who uses an electronic device or a device (e.g., artificial intelligence electronic device) that uses an electronic device.

Prior to the detailed description, hereinafter, "front-side notification" means that the user is visually notified of the occurrence of the event by using a light-emitting device that is mounted on the front side of the electronic device, on which the display is positioned. In addition, "lateral-side notification" denotes that the user is visually notified of the occurrence of the event by using the lateral side of the electronic device, and "back-side notification" denotes that the user is visually notified of the occurrence of the event by using the back side of the electronic device. For example, when the event occurs, the electronic device, according to various embodiments, may activate light-emitting elements {e.g., LEDs (Light Emitting Diode)} provided on at least some area of a display or on the front side of the electronic device, and may guide the light of the display or the light-emitting elements to the lateral side or the back side thereof through a light guide unit in order to thereby visually notify the user of the occurrence of the event.

The occurrence of the event may include receiving text messages, receiving instant messages, receiving push messages (app-update messages, or advertisement messages), receiving a call request, or detecting a change in status information (charging, completion of charging, low battery, presence of unidentified information, etc.) of the electronic device.

Figure 1B:
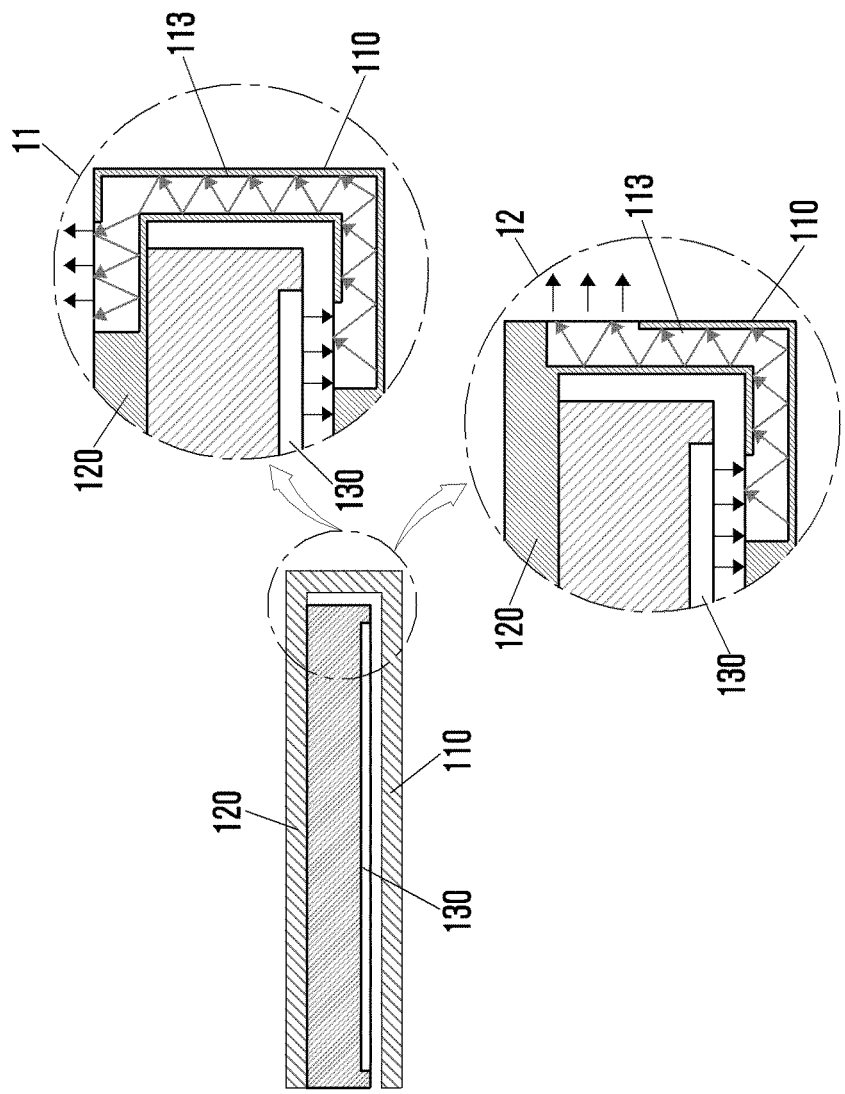
FIG. 1B is a cross-sectional view of A-A' in the electronic device, according to various embodiments.

FIG. 1A illustrates the electronic device, according to an embodiment of the present disclosure, and FIG. 1B is a cross-sectional view of A-A' in the electronic device, according to an embodiment of the present disclosure.

Referring to FIG. 1A and FIG. 1B, the electronic device 100, according to an embodiment of the present disclosure, may include a touch screen 130 and a home key 140, which are provided on the front side thereof. A light-emitting element 150 may be provided to surround the home key 140. The electronic device 100 may visually notify the user of the occurrence of the event through the touch screen 130 or the light-emitting element 150. For example, when a text message is received, the electronic device 100 may turn on the touch screen 130, and may output a text message icon or a pop-up window, which indicates the receipt of the text message. The electronic device 100 may turn off the touch screen 130 after a predetermined time (e.g. 10 seconds). At this time, if the user does not check the received text message, the electronic device 100 may activate the light-emitting element 150 according to a predetermined rule. For example, the electronic device 100 may turn on and off the light-emitting element 150 periodically.

The electronic device 100 may include a flip cover 110 that covers the touch screen 130. The flip cover 110 may be integrally formed with a battery cover 120.

At least some area of the flip cover 110 and the battery cover 120 may include a light guide unit 113 that transmits an optical signal (e.g., light). The light guide unit 113 may be a light diffusion plate or an optical waveguide. The light diffusion plate or the optical waveguide may be provided in the form of a thin film. Here, the light diffusion plate or the optical waveguide is well-known to those skilled in the art, so the detailed description thereof will be omitted.

As shown in FIG. 1B, the light guide unit 113 may guide the light emitted from the display of the touch screen 130 to the back side or the lateral side of the electronic device 100. For example, when the occurrence of the event is detected, the electronic device 100 may determine whether or not the front side of the electronic device 100 is blocked (e.g., whether or not the electronic device 100 is placed upside down on the table), and if the front side is blocked, the electronic device 100 may activate at least some area of the display of the touch screen 130. At this time, as shown in diagram 11 of FIG. 1B, the light output from the activated part of the display is guided to the back side of the electronic device 100 through the light guide unit 113 to then be output to the outside. Alternatively, as shown in diagram 12 of FIG. 1B, the light of the display is guided to the lateral side of the electronic device 100 through the light guide unit 113 to then be output to the outside.

In addition, although it is not shown in the drawings, according to some embodiments, the light guide unit 113 may deliver the light emitted from the light-emitting element 150 to the back side or the lateral side. According to this, the electronic device 100, according to an embodiment of the present disclosure, may visually notify the user of the existence of the unidentified information (text messages, advertisement messages, etc.) or the electronic device status (charging, completion of charging, low battery, sleep mode, etc.) even when the front-side notification of the electronic device 100 is not viable. For example, a green light emitted from the light-emitting element 150 when the charging is completed may be transferred to the lateral side or back side of the electronic device 100 through the light guide unit 113. At this time, the user may recognize that the charging has been completed through the light emitted from the lateral side or back side of the electronic device.

Figure 2A:
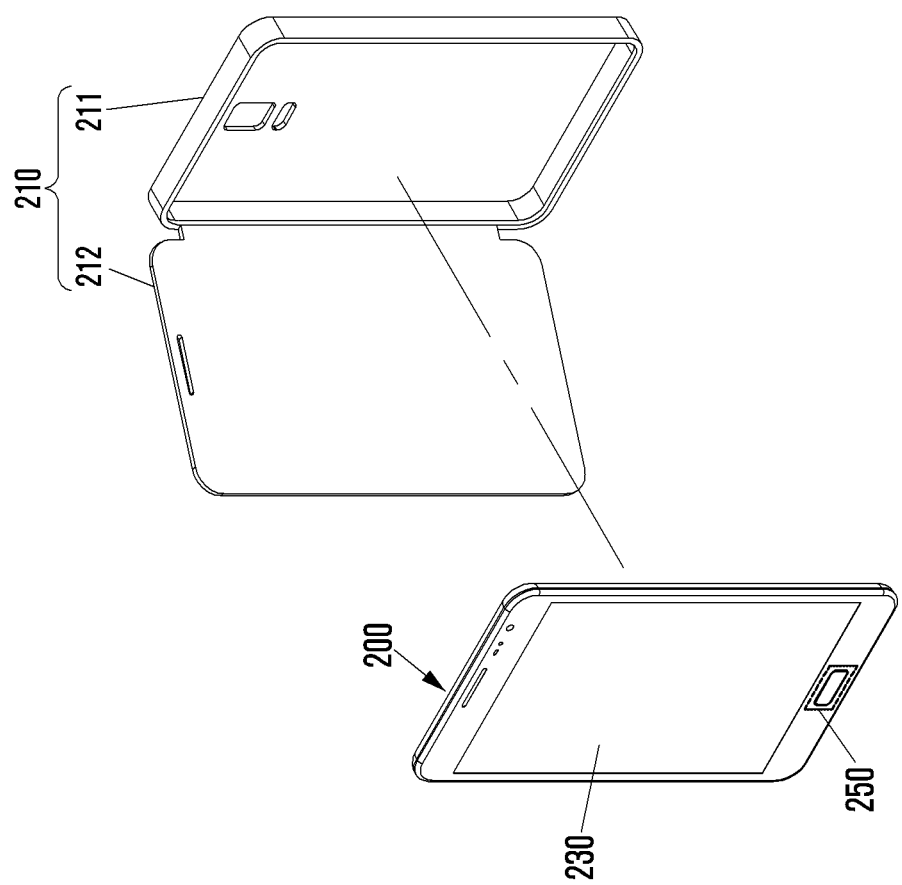
FIG. 2A illustrates an electronic device, according to an embodiment of the present disclosure.
Figure 2B:
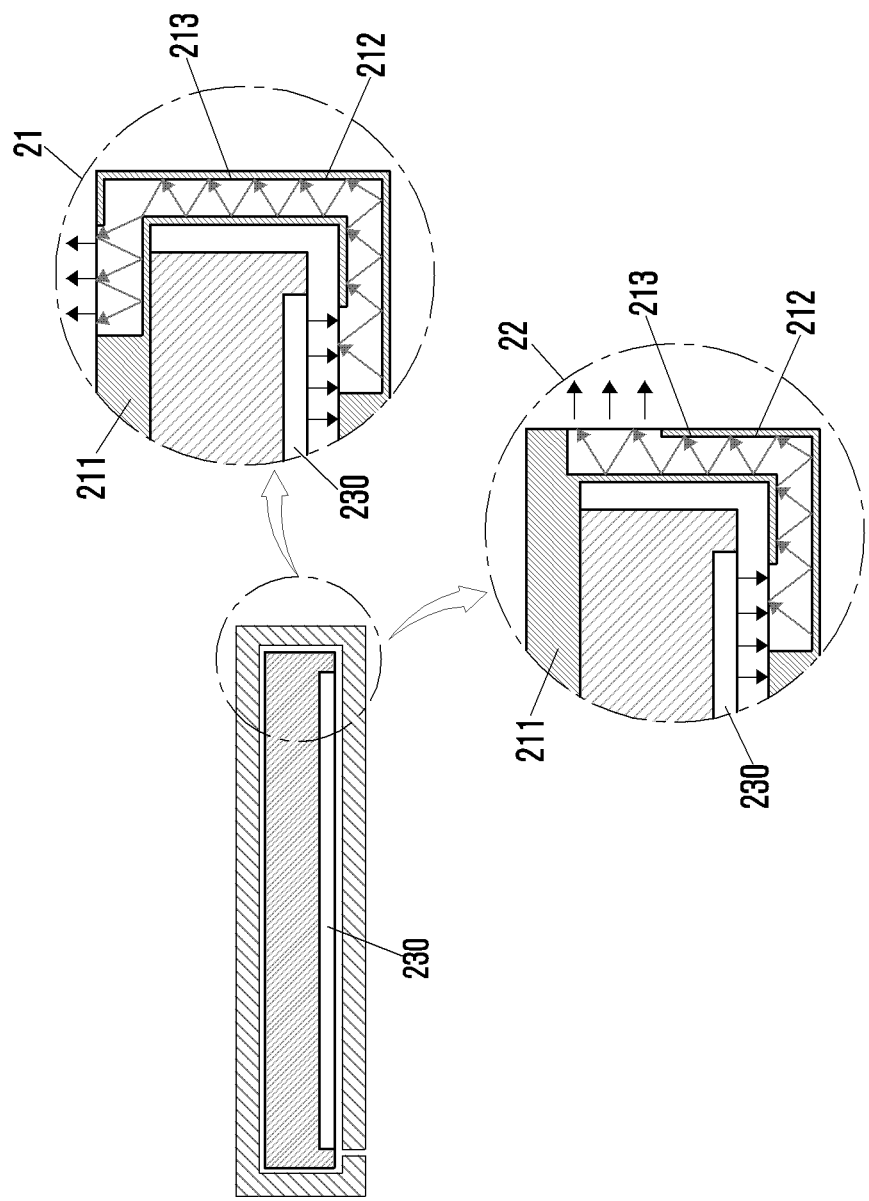
FIG. 2B is a cross-sectional view of an electronic device, according to an embodiment of the present disclosure.

FIG. 2A illustrates the electronic device, according to an embodiment of the present disclosure. FIG. 2B is a cross-sectional view of the electronic device, according to an embodiment of the present disclosure.

Referring to FIG. 2A and FIG. 2B, the electronic device 200, according to an embodiment of the present disclosure, may be fastened to a flip-cover type of case 210. The flip-cover type of case 210 may be comprised of a receiving member 211 that accepts the electronic device 200, and a cover 212 that covers the front side of the electronic device 200. The flip-cover type of case 210 may include a light guide unit 213. The light guide unit 213 may transmit the light from the display of a touch screen 230 to the lateral side or back side of the electronic device. For example, when an event occurs while the touch screen 230 is blocked by the cover 212, the electronic device 100 may activate at least some area of the display of the touch screen 230. At this time, as shown in diagram 21 of FIG. 2B, the light output from the activated display is guided to the back side of the electronic device 200 through the light guide unit 213 to then be output to the outside. Alternatively, as shown in diagram 22 of FIG. 2B, the light of the display is guided to the lateral side of the electronic device 200 through the light guide unit 213 to then be output to the outside.

In addition, although it is not shown in the drawings, according to some embodiments, the light guide unit 213 may deliver the light emitted from the light-emitting element 250 to the back side or the lateral side of the electronic device 200.

Figure 3A:
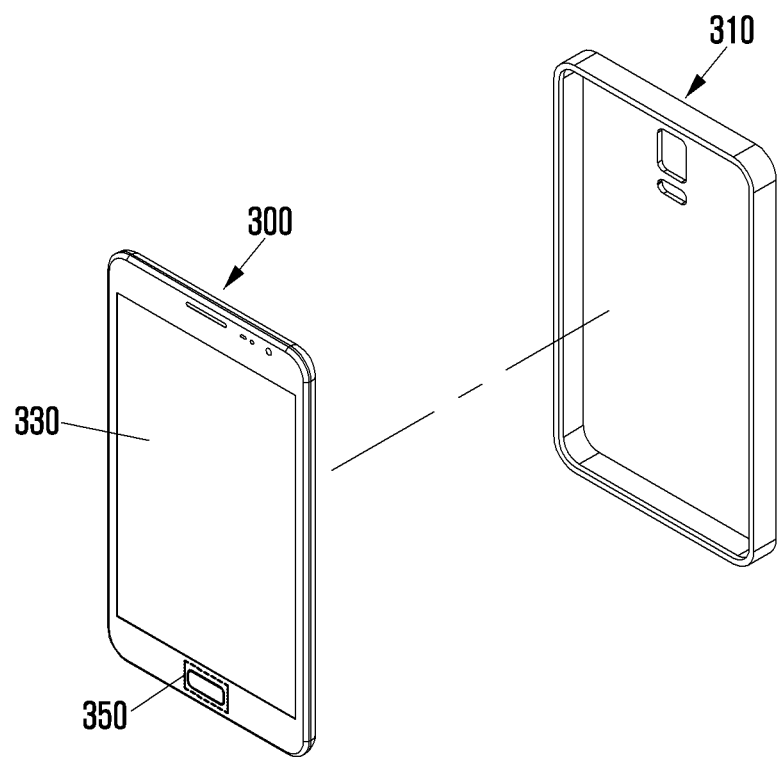
FIG. 3A illustrates an electronic device, according to an embodiment of the present disclosure.
Figure 3B:
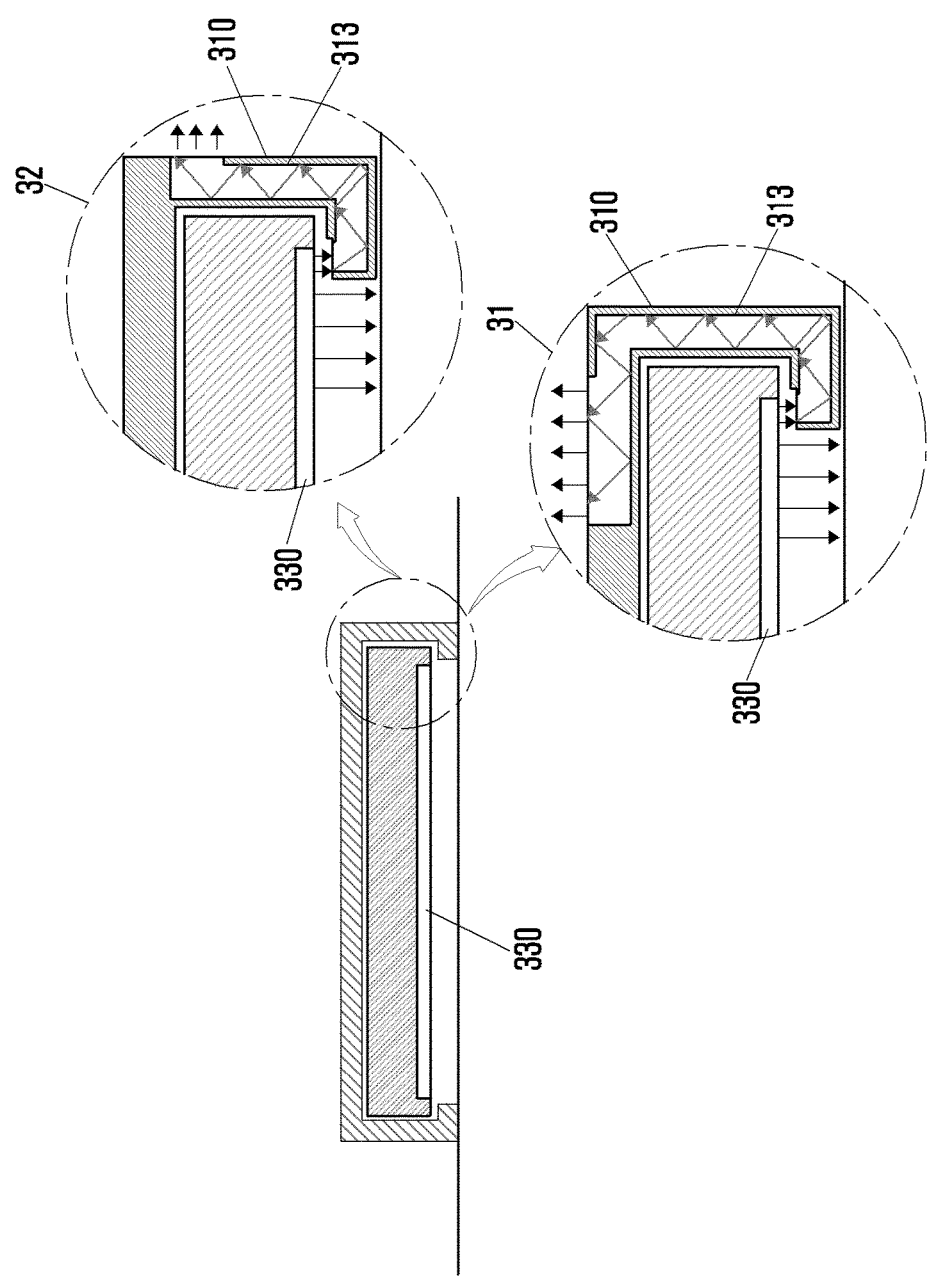
FIG. 3B is a cross-sectional view of an electronic device, according to an embodiment of the present disclosure.

FIG. 3A illustrates the electronic device, according to an embodiment of the present disclosure. FIG. 3B is a cross-sectional view of the electronic device, according to an embodiment of the present disclosure.

Referring to FIG. 3A and FIG. 3B, the electronic device 300, according to various embodiments, may be fastened to a back-side cover type of case 310. The back-side cover type of case 310 may be formed to cover the back side, the lateral side, and a portion of the front side of the electronic device 300. The back-side cover type of case 310 may include a light guide unit 313. The light guide unit 313 may transmit the light emitted from the display of a touch screen 330 to the back side or lateral side of the electronic device 300. For example, when an event occurs while the electronic device 300 is placed upside down, the electronic device 300 may activate at least some area of the display of the touch screen 330. At this time, as shown in diagram 31 of FIG. 3B, the light emitted from at least some area of the activated display may be guided to the back side of the electronic device 300 through the light guide unit 313 to then be output to the outside. Alternatively, as shown in diagram 32 of FIG. 3B, the light emitted from the display may be guided to the lateral side of the electronic device 300 through the light guide unit 313 to then be output to the outside.

In addition, although it is not shown in the drawings, according to some embodiments, the light guide unit 313 may deliver the light emitted from the light-emitting element 350 to the back side or the lateral side of the electronic device 300.

Figure 4A:
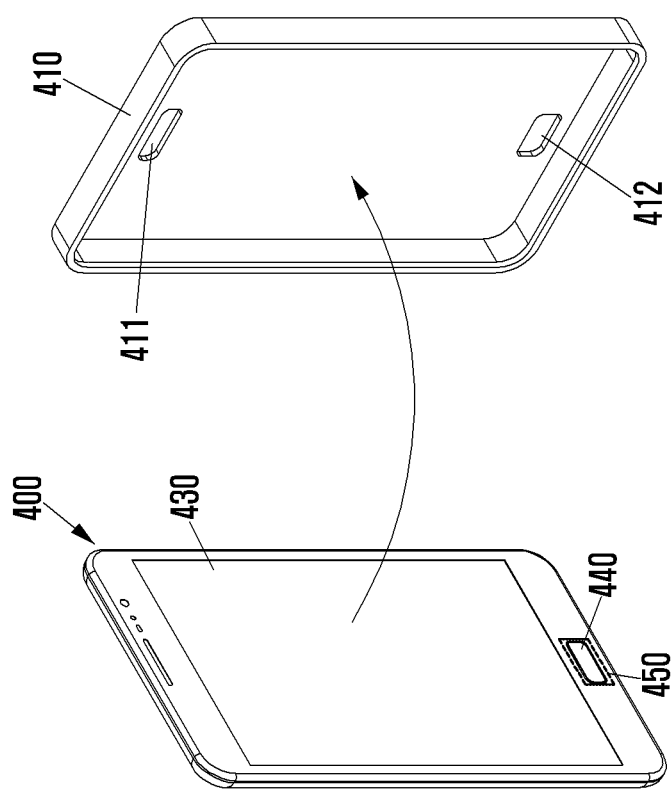
FIG. 4A illustrates an electronic device, according to an embodiment of the present disclosure.
Figure 4B:
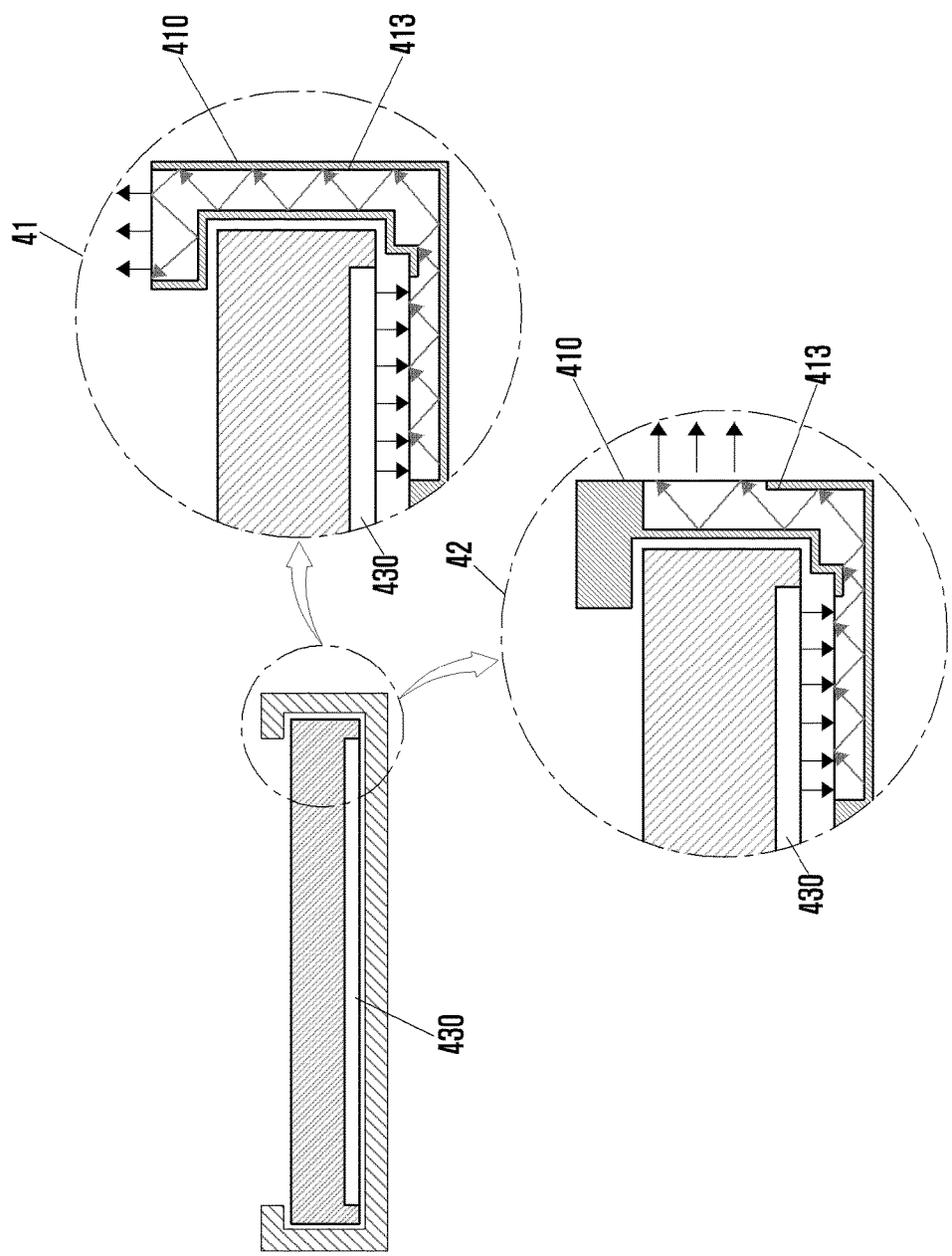
FIG. 4B is a cross-sectional view of an electronic device, according to an embodiment of the present disclosure.

FIG. 4A illustrates the electronic device, according to an embodiment of the present disclosure. FIG. 4B is a cross-sectional view of the electronic device, according to an embodiment of the present disclosure.

Referring to FIG. 4A and FIG. 4B, the electronic device 400, according to various embodiments, may be fastened to a front-side cover type of case 410. The front-side cover type of case 410 may be formed to cover the front side, the lateral side, and a portion of the back side of the electronic device 400. The front-side cover type of case 410 may have the first hole 411 for outputting a sound, a home key 440, and the second hole 412 through which a light-emitting element 450 is exposed to the outside.

In addition, the front-side cover type of case 410 may include a light guide unit 413. The light guide unit 413 may transmit the light from the display of a touch screen 430 to the back side of the electronic device 400. For example, when an event occurs while the electronic device 400 is placed upside down, the electronic device 400 may activate at least some area of the display of the touch screen 430. At this time, as shown in diagram 41 of FIG. 4B, the light output from at least some area of the activated display may be guided to the back side of the electronic device 400 through the light guide unit 413 to then be output to the outside. Alternatively, as shown in diagram 42 of FIG. 4B, the light from the display may be guided to the lateral side of the electronic device 400 through the light guide unit 413 to then be output to the outside.

In addition, although it is not shown in the drawings, according to some embodiments, the light guide unit 413 may deliver the light emitted from the light-emitting element 450 to the back side or the lateral side of the electronic device 400.

Figure 5A:
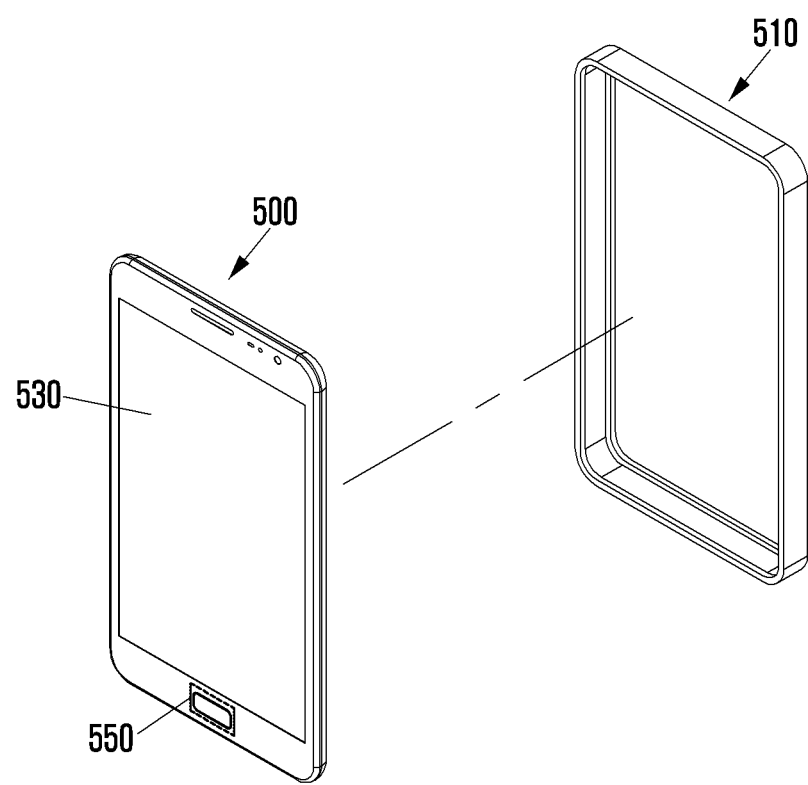
FIG. 5A illustrates an electronic device, according to an embodiment of the present disclosure.
Figure 5B:
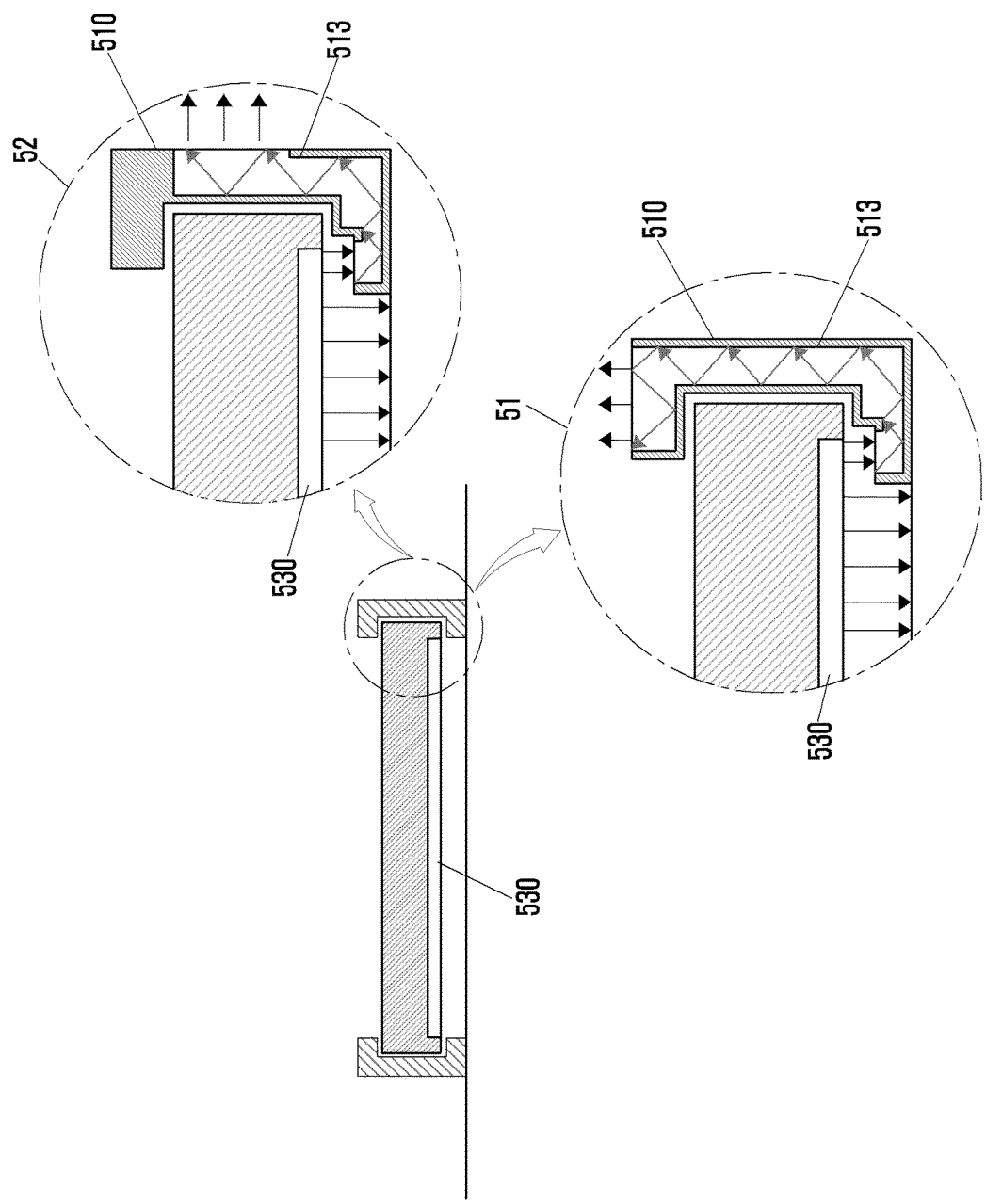
FIG. 5B is a cross-sectional view of an electronic device, according to an embodiment of the present disclosure.

FIG. 5A illustrates the electronic device, according to an embodiment of the present disclosure. FIG. 5B is a cross-sectional view of the electronic device, according to an embodiment of the present disclosure.

Referring to FIG. 5A and FIG. 5B, the electronic device 500, according to various embodiments, may be fastened to a bumper type of case 510. The bumper type of case 510 may be formed to cover a portion of the front side, the lateral side, and a portion of the back side of the electronic device 500. The bumper type of case 510 may include a light guide unit 513. The light guide unit 513 may transmit the light emitted from the display of a touch screen 530 to the back side of the electronic device 500. For example, when an event occurs while the electronic device 500 is placed upside down, the electronic device 500 may activate at least some area of the display of the touch screen 530. At this time, as shown in diagram 51 of FIG. 5B, the light output from at least some area of the activated display may be guided to the back side of the electronic device 500 through the light guide unit 513 to then be output to the outside. Alternatively, as shown in diagram 52 of FIG. 5B, the light from the display may be guided to the lateral side of the electronic device 500 through the light guide unit 513 to then be output to the outside.

In addition, although it is not shown in the drawings, according to some embodiments, the light guide unit 513 may deliver the light emitted from the light-emitting element 550 to the back side or the lateral side of the electronic device 500.

Figure 6:
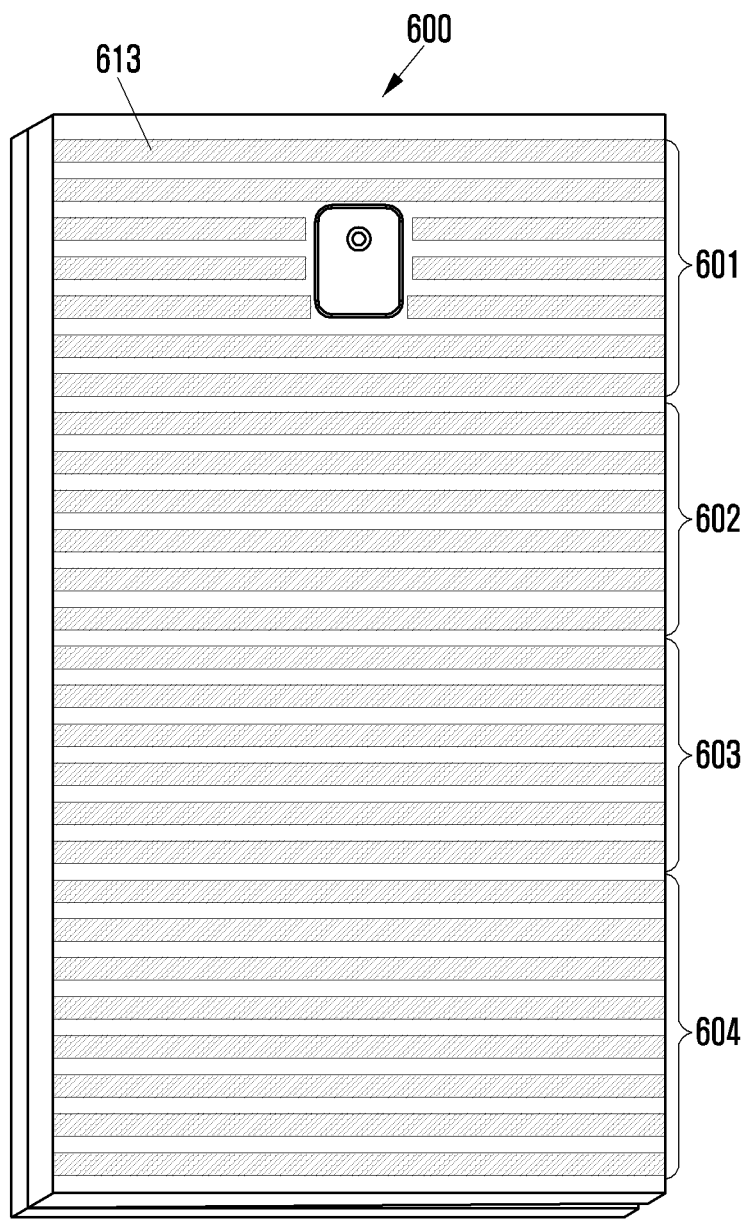
FIG. 6 is a view for explaining various notification methods of an electronic device, according to an embodiment of the present disclosure.

FIG. 6 is a view for explaining various notification methods of the electronic device, according to an embodiment of the present disclosure.

Referring to FIG. 6, a battery cover of the electronic device 600 or a case attached to the electronic device 600 may include a plurality of light guide units 613. The plurality of light guide units 613 may be arranged in a single file line (single-row multi-column). Meanwhile, although the light guide units 613 are illustrated as being exposed to the outside in FIG. 6 for convenience of explanation, the light guide units 613 are not actually exposed to the user.

The electronic device 600 may roughly recognize the display position of a pop-up window or an icon according to the occurrence of the event through the light guide units 613 arranged in a single file line (single-row multi-column). For example, when the pop-up window is displayed at the position corresponding to the first area 601 according to the occurrence of the event, the light guide units 613 of the first area 601 may output a light of a different color from the light guide units 613 of a second area 602, a third area 603, and a fourth area 604. According to this, the user may recognize that the pop-up window is displayed at the upper area of the display, which corresponds to the first area 601.

In addition, if the display position of the pop-up window or the icon is different depending on events, the user may roughly recognize the type of event. For example, when the IM message or the advertisement message is received, the pop-up window may be displayed in the second area 602, and when the text message or the e-mail is received, a text icon or an e-mail icon may be displayed in the first area 601. In this case, if the light from the light guide units 613 of the second area has a different color from the light of other areas, the user may recognize that the IM message or the advertisement message has been received.

According to some embodiments, the electronic device 600 may configure the light-emitting area to be different depending on the type of event. For example, the electronic device 600 may emit light in the first area 601 when the text message is received. To this end, the electronic device 600 may activate a portion of the display, which corresponds to the first area 601. Alternatively, the electronic device 600 may allow the portion of the display corresponding to the first area 601 to emit a light of a specific color (e.g., yellow), and may allow the remaining portion thereof to emit a black light.

Alternatively, the electronic device 600 may: allow the second area 602 to emit light when a call request is received; allow the third area 603 to emit light when the e-mail is received; and allow the fourth area 604 to emit light when the advertisement message is received.

According to some embodiments, the electronic device 600 may configure the light-emitting color to be different depending on the type of event. For example, the electronic device 600 may emit a yellow light in at least a part of the display when the text message is received, and may emit a blue light in at least a part of the display when the call request is received.

According to some embodiments, the electronic device 600 may configure the light-emitting area and the light-emitting color to be different depending on the type of event.

Meanwhile, although a plurality of light guide units are arranged in a single file line (single-row multi-column) in FIG. 6, the plurality of light guide units may be arranged in a single lateral line (multi-row single-column) or in a multi-line and column (multi-row multi-column).

Further, although FIG. 6 shows an example of the back-side notification, the electronic device, according to some embodiments, may have a plurality of light guide units provided on the lateral side thereof, and may notify the user of the occurrence of the event, the position, or the type of event by using the plurality of light guide units provided on the lateral side in a similar manner as FIG. 6.

Figure 7A:
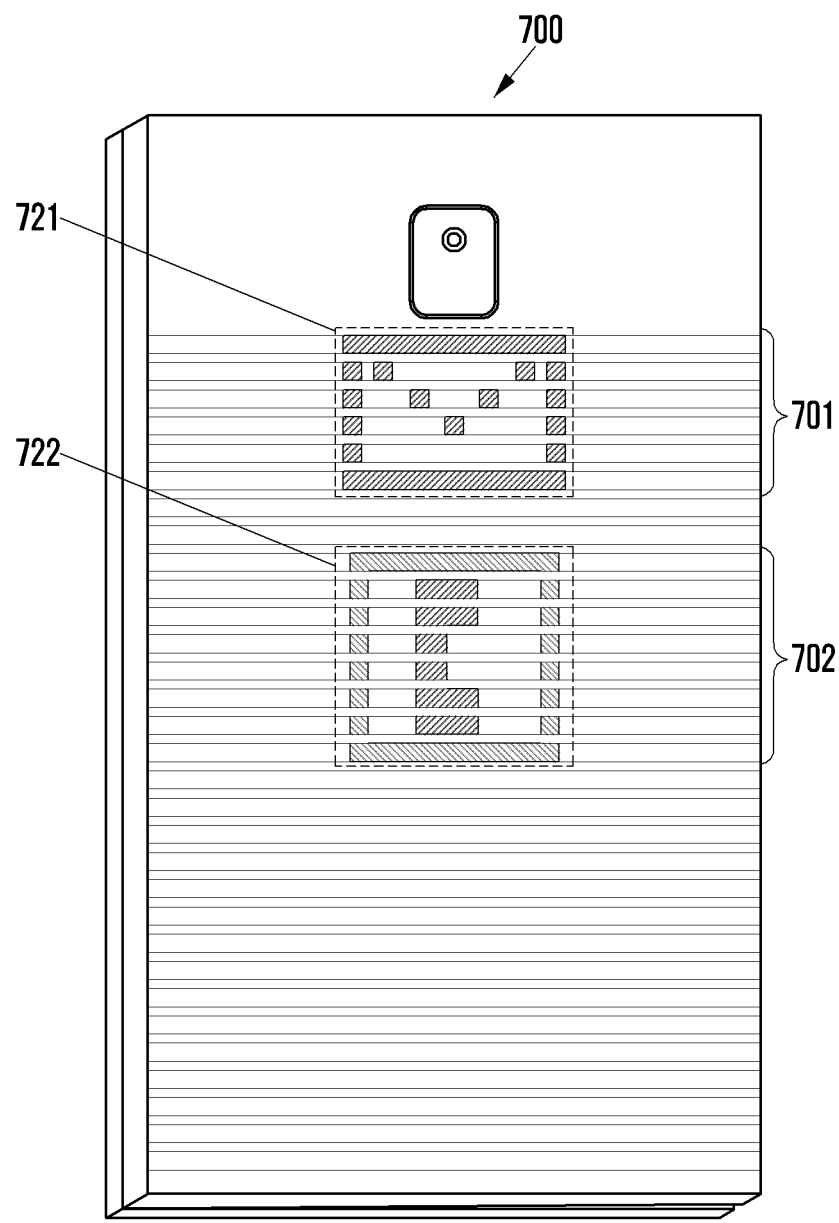
FIG. 7A and FIG. 7B are views for explaining a back-side notification method of an electronic device, according to an embodiment of the present disclosure.
Figure 7B:
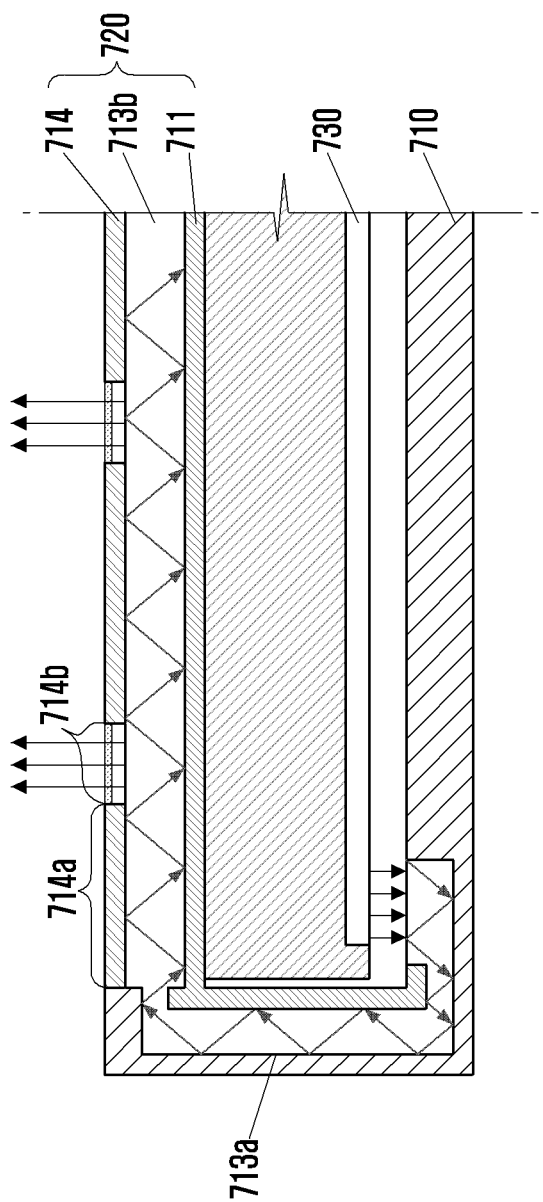

FIG. 7A and FIG. 7B are views for explaining the back-side notification method of an electronic device, according to an embodiment of the present disclosure.

Referring to FIG. 7A and FIG. 7B, the electronic device 700, according to an embodiment of the present disclosure, may provide the back-side notification in the form of an icon. For example, as shown in FIG. 7A, the electronic device 700 may display a text message icon 721 on the back side upon the receipt of a text message. More specifically, when the text message is received, the electronic device 700 may activate a portion of the display corresponding to the first area 701. The light output from the portion of the activated display is transferred to the first area 701 to then be output to the outside in order to thereby display the text message icon 721.

Likewise, when a call request is received, the electronic device 700 may activate a portion of the display corresponding to the second area 702 in order to thereby display a handset icon 722.

Referring to FIG. 7B for more detailed description, when the event occurs while the display of a touch screen 730 is blocked by a front cover 710, the light of the display is transferred to a light diffusion plate 713*b* of a back cover 720 through an optical waveguide 713*a*, and may be diffused by the light diffusion plate 713*b*. The diffused light may be emitted to the outside in a specific form (icon) by a pattern layer 714 that is formed (printed or coated) on the light diffusion plate 713*b*.

More specifically, the pattern layer 714 may include a non-penetration area 714*a* through which the light of the display cannot pass, and a penetration area 714*b* through which the light of the display can pass. The penetration area 714*b* is normally opaque without the light of the display.

Meanwhile, FIG. 7A shows the pattern layer 714 that displays the text message icon 721 and the handset icon 722.

However, according to other embodiments of the present disclosure, the pattern layer may be formed to display three or more icons.

In addition, although it is not shown in the drawings, the back cover 720 may include a reflective plate that is formed in the bottom area 711 of the light diffusion plate 713*b* in order to reflect the light, which is emitted downwards, into the top of the light diffusion plate 713*b*.

Figure 8:
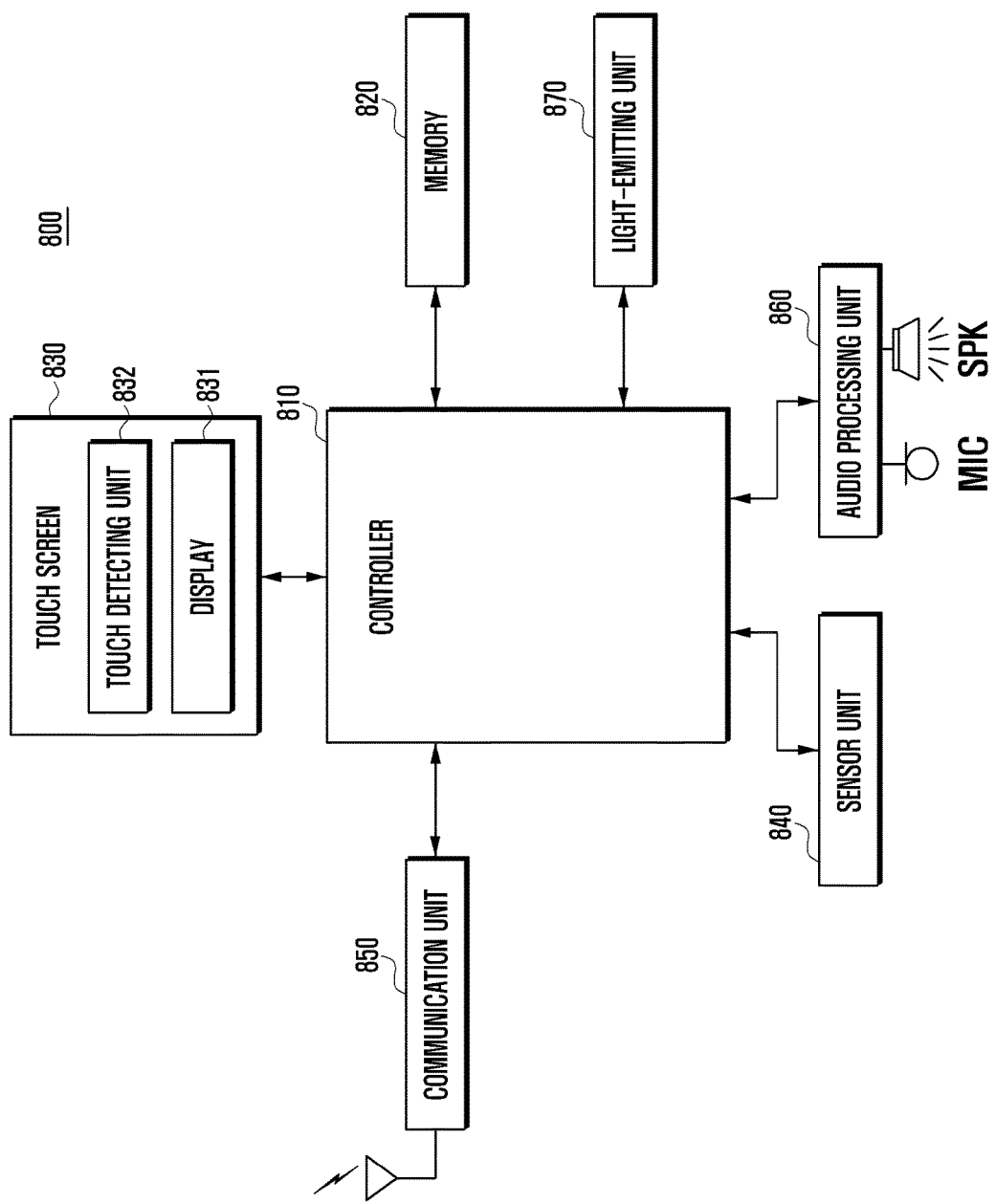
FIG. 8 is a block diagram showing the configuration of an electronic device, according to an embodiment of the present disclosure.

FIG. 8 is a block diagram showing the configuration of the electronic device, according to an embodiment of the present disclosure.

Referring to FIG. 8, the electronic device 800, according to an embodiment of the present disclosure, may include a controller 810, a memory 820, a touch screen 830, a sensor unit 840, a communication unit 850, an audio processing unit 860, and a light-emitting unit 870. The touch screen 830 may include a display 831 and a touch detecting unit 832.

The controller 810 may control the overall operation of the electronic device 800 and a signal flow between internal blocks of the electronic device 800, and may perform a data processing function. For example, the controller 810 may be implemented by a Central Processing Unit (CPU), an application processor, or the like. The controller 810 may be formed of a single-core processor or a multi-core processor. In addition, the controller 810 may be comprised of a plurality of processors.

The controller 810, according to various embodiments, may control the notification providing process. For example, the controller 810 may identify the status of the electronic device 800 through the sensor unit 840 when the event occurrence is detected, and may provide the front-side/back-side notification. More specifically, if the front-side notification of the electronic device is unviable, the controller 810 may activate at least a part of the display 831, and may transfer the light emitted from the part of the display to at least one of the lateral side or the back side of the electronic device in order to thereby provide the lateral-side/back-side notification. On the contrary, if the front-side notification is viable, the controller 810 may notify the user of the occurrence of the event through the display 831 and/or the light-emitting unit 870.

The controller 810 may configure the light-emitting color and/or the light-emitting area of the display to be different depending on the type of event. Thus, the user may easily recognize the type of the event.

The memory 820 may store application programs necessary for other optional functions, such as an audio reproduction function, an image or video reproduction function, a broadcast reproduction function, an Internet access function, a text messaging function, games, or navigation, as well as an operating system (OS) of the electronic device 800. In addition, the memory 820 may store a variety of data, such as music data, video data, game data, movie data, or map data.

The memory 820, according to an embodiment of the present disclosure, may store a color table that records the colors depending on the type of event. For example, the event-color table may map: the event of receiving the text message with the first color (e.g., yellow); the event of receiving the call request with the second color (e.g., red); and the event of receiving the advertisement message with the third color (e.g., green), and may store the same.

In addition, the memory 820 may store an activation area table that records the activated areas of the display 831 depending on the type of event. For example, in the case where the display 831 has three areas, the event-activation area table may map: the event of receiving the text message with the first area; the event of receiving the call request with the second area; and the event of receiving the advertisement message with the third area, and may store the same.

The event-color table and the event-activation area table may be changed by the user.

The touch screen 830 may perform an input function and a display function. To this end, the touch screen 830 may include the display 831 and the touch detecting unit 832.

The display 831 may display information, which is provided by or to the user, as well as various menus of the electronic device 800. The display 831 may be implemented by a liquid crystal display, an Organic Light Emitted Diode (OLED), an Active Matrix Organic Light Emitted Diode (AMOLED), a flexible display, or the like. The display 831 may provide a variety of screens, such as a home screen, a menu screen, a locked screen, game screens, web page screens, or a phone-call screen, according to the use of the electronic device 800. At least a part of the display 831, according to an embodiment of the present disclosure, may be activated when providing the back-side notification. For example, in the case where the pixels constituting the display 831 can be individually turned on/off, only the pixels corresponding to the part to be activated on the display 831 may be turned on. Alternatively, in the case where the pixels constituting the display 831 cannot be individually turned on/off, the display 831 may display the area except for the part to be activated on the display 831 in black.

The touch detecting unit 832 may provide an input function, and may create a touch event when touch input means, such as a user's finger, a stylus, or a touch pen, touch or approach the same to then transmit the created touch event to the controller 810. More specifically, the touch detecting unit 832 may recognize the occurrence of the touch event through a change in a physical quantity (e.g., capacitance, resistance, etc.) due to the touch or proximity of the touch input means. In addition, the touch detecting unit 832 may further include an electromagnetic induction type of touch panel in order to recognize an electromagnetic induction type of electronic pen. The configuration of the touch detecting unit 832 is obvious to those skilled in the art, so the detailed description thereof will be omitted.

The sensor unit 840 may check the status of the electronic device 800. The sensor unit 840 may include one or more sensors. For example, the sensor unit 840 may include a tilt sensor, a motion sensor, an acceleration sensor, a gravity sensor, an illuminance sensor, an infrared sensor, a geomagnetic sensor, a gyro sensor, or the like. The sensor unit 840, according to an embodiment of the present disclosure, may transmit a sensor value corresponding to the status of the electronic device to the controller 810.

The communication unit 850 may support a wired and/or wireless communication function of the electronic device 800. For example, the communication unit 850 may include a mobile communication module for supporting a mobile communication function (e.g., $2^{nd}$ Generation (2G), 3G, 4G, and/or 5G standard mobile communications), a wireless local area network (LAN) communication module, a Wi-Fi communication module, a Bluetooth communication module, an infrared communication module, and a Zigbee communication module, which support a short-range wireless communication function, or a Universal Serial Bus (USB) communication module and a High Definition Multimedia Interface (HDMI) communication module, which support a wired communication function.

The communication unit 850, according to an embodiment of the present disclosure, may receive a variety of events. For example, the communication unit 850 may receive text messages, call requests, or advertisement messages.

The audio processing unit 860 may be connected with a speaker (SPK) for outputting audio signals received during the phone call, audio signals included in the received messages, or audio signals according to the reproduction of audio files stored in the memory 820, and one or more microphones (MIC) for collecting the user's voice signal or other audio signals. For example, the audio processing unit 860 may output, through the speaker (SPK), audio signals according to the reproduction of music files or video files, or the playing of games. In addition, the audio processing unit 160 may output, through the speaker (SPK), audio signals for audibly notifying of the occurrence of the event.

The light-emitting unit 870 may be activated upon the occurrence of the event in order to visually notify the user of the occurrence of the event. The light-emitting unit 870 may be positioned on the front side of the electronic device 800. For example, the light-emitting unit 870 may be formed to surround the home key (not shown). Alternatively, the light-emitting unit 870 may be positioned at the upper end of the display 831. The light-emitting unit 870 may be an LED.

The light-emitting unit 870, according to an embodiment of the present disclosure, may emit light according to a predetermined rule upon the occurrence of the event in order to thereby provide visual notification to the user. For example, in the case of the occurrence of the event, such as the reception of text messages, the completion of the charging, low battery, or the existence of unidentified information, the light-emitting unit 870 may be turned on and off in a predetermined color in a specific period, or may continuously emit a light of a specific color.

Meanwhile, if the electronic device 800 does not provide a separate visual notification, the light-emitting unit 870 may be excluded from the electronic device 800.

Although it is not shown in FIG. 8, the electronic device 800 may selectively include various sensor modules, such as a broadcast receiving module for the broadcast reception, a digital sound source reproducing module, such as an MP3 module, an infrared sensor module, or an illuminance sensor module. In addition, the electronic device 800, according to an embodiment of the present disclosure, may further include elements equivalent to the elements mentioned above.

Figure 9:
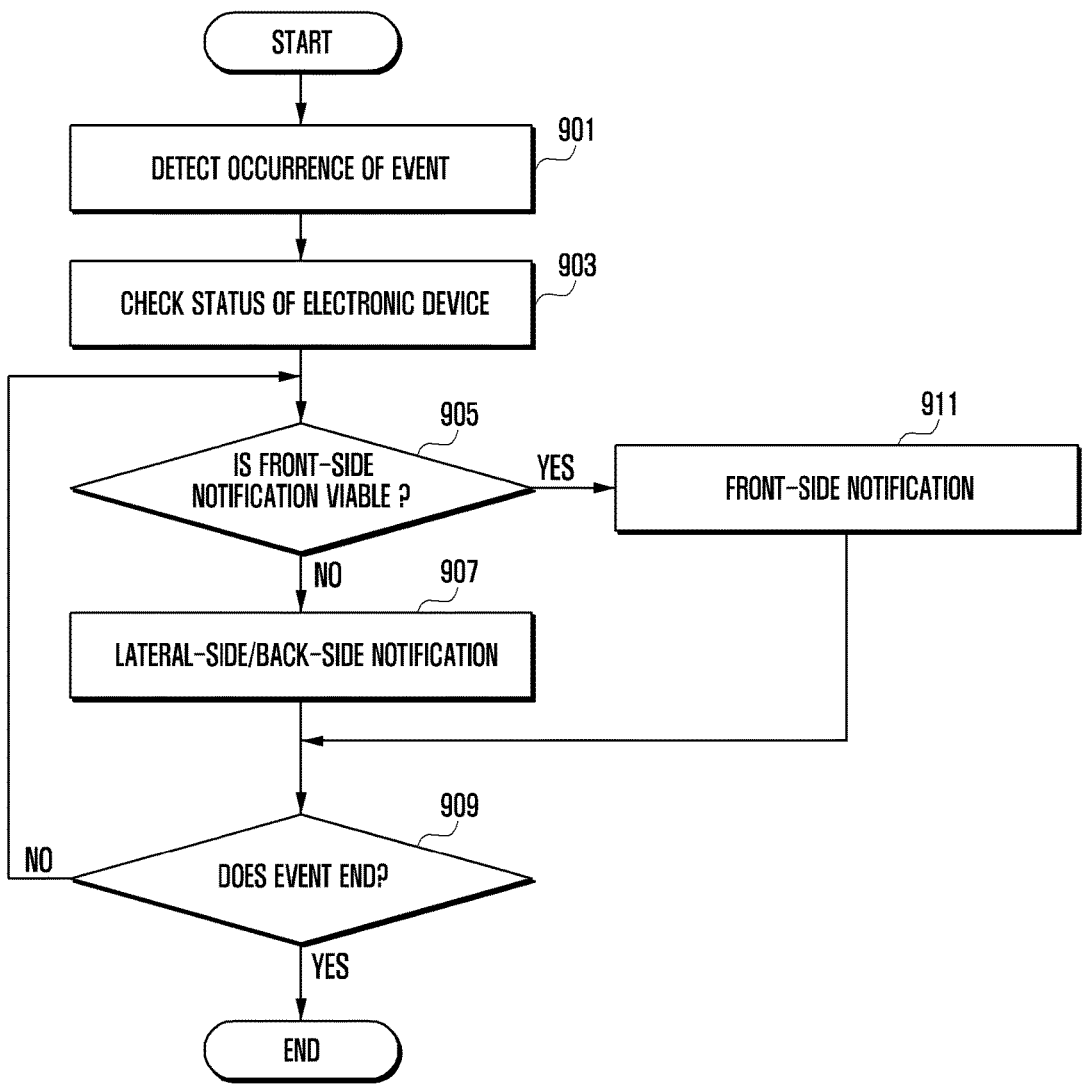
FIG. 9 is a flowchart illustrating a notification providing method of an electronic device, according to an embodiment of the present disclosure.

FIG. 9 is a flowchart illustrating a notification providing method of an electronic device, according to an embodiment of the present disclosure.

Referring to FIG. 9, the controller 810 of the electronic device 800, according to an embodiment of the present disclosure, may detect the occurrence of an event in operation 901. The event may include the reception of text messages, the reception of call requests, the reception of push messages, such as advertisement messages, the completion of the charging, or low battery.

After the event is detected, the controller 810 may check the status of the electronic device 800 in operation 903. For example, the controller 810 may receive various sensor values that are input from the sensor unit 840, and may check the status of the electronic device 800 based on the received sensor values.

The controller 810 may identify whether or not the front-side notification of the detected event is viable in operation 905. For example, the controller 810 may identify whether or not the received sensor values correspond to a state in which the display 831 of the electronic device 800 faces downwards (that is, the electronic device 800 is placed upside down).

If the front-side notification is not viable, the controller 810 may proceed to operation 907 in order to thereby provide a lateral side/back-side notification to the user. For example, the controller 810 may activate at least a part of the display 831. Alternatively, in the case where the light-emitting unit 870 is provided on the front side of the electronic device 800, the light-emitting unit 870 may be activated.

The light of the display 831 or the light-emitting unit 870 may be guided to at least one of the lateral side or the back side of the electronic device 800 through the light guide unit to then be output to the outside. The user may visually recognize the occurrence of the event through the light emitted from one of the lateral side and the back side. Here, the lateral side/back-side notification has been described in FIG. 1 to FIG. 7B, so the detailed description thereof will be omitted.

Meanwhile, if the front-side notification is viable, the controller 810 may proceed to operation 911 in order to thereby provide the front-side notification. The controller 810 may display an icon or a popup window on the display 831 to provide the front-side notification. Alternatively, the controller 810 may turn on and off the light-emitting unit 870 formed on one side of the electronic device 800 according to a predetermined rule in order to thereby provide the front-side notification.

The controller 810 may determine whether or not the event has ended in operation 909. The event, for example, may end when the user checks the event (that is, the user views the received text message). If the event has not ended, the controller 810 may proceed to operation 905 to repeat the operations above. For example, if the front side of the electronic device 800 turns upwards while the back-side notification is provided, the controller 810 may provide the front-side notification. On the contrary, when the front side of the electronic device 800 turns downwards while the front-side notification is provided, the controller 810 may provide the back-side notification.

Meanwhile, if the event has ended, the controller 810 may end the notification providing process.

Figure 10:
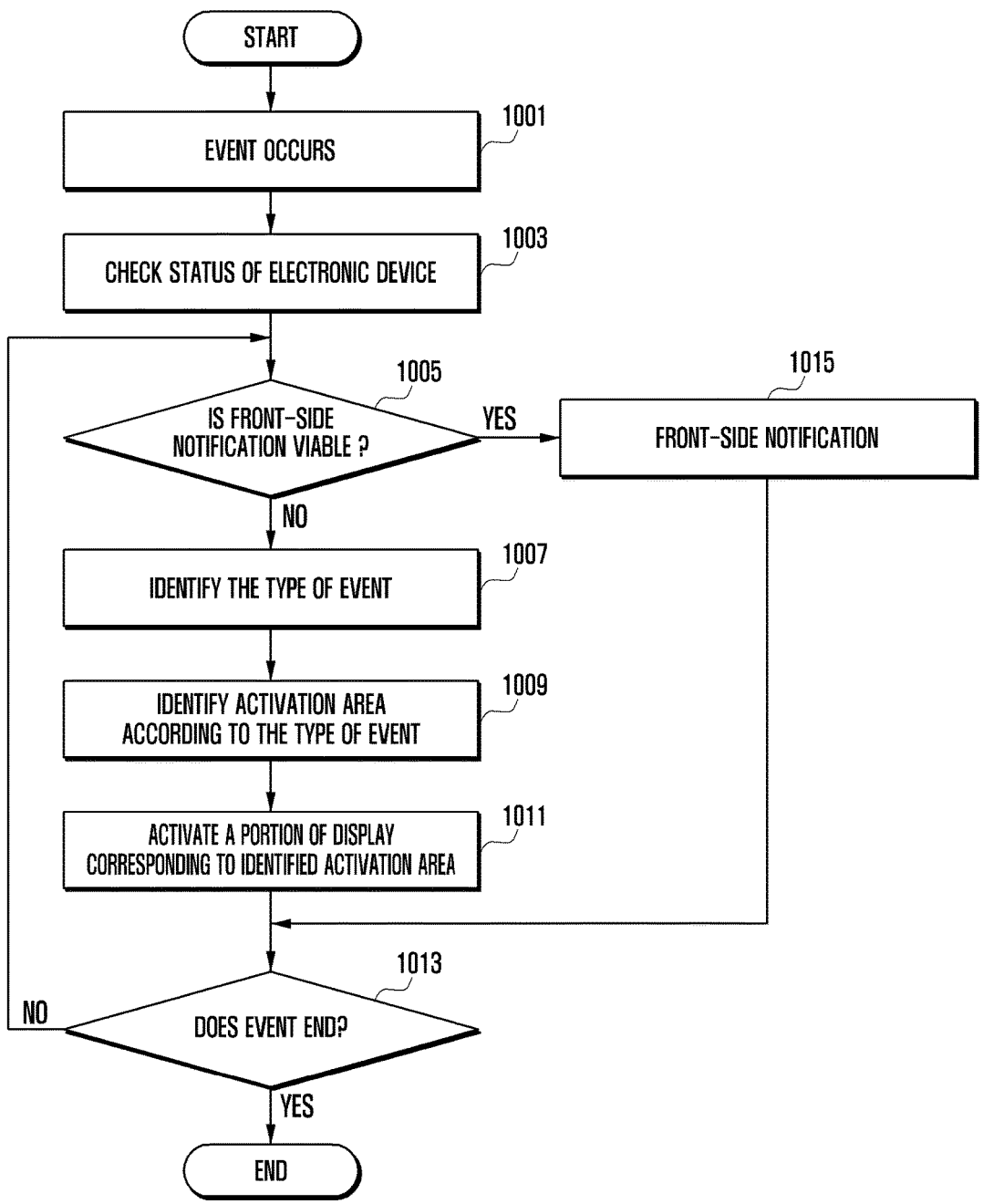
FIG. 10 is a flowchart illustrating a notification providing method of an electronic device, according to an embodiment of the present disclosure.

FIG. 10 is a flowchart illustrating a notification providing method of an electronic device, according to an embodiment of the present disclosure.

Referring to FIG. 10, the controller 810 of the electronic device 800, according to an embodiment of the present disclosure, may detect the occurrence of an event in operation 1001.

The controller 810 may check the status of the electronic device 800 in operation 1003. For example, the controller 810 may receive various sensor values that are input from the sensor unit 840, and may check the status of the electronic device 800 based on the received sensor values.

The controller 810 may identify whether or not the front-side notification of the detected event is viable in operation 1005. For example, the controller 810 may identify whether or not the received sensor values correspond to a state in which the display 831 of the electronic device 800 faces downwards (that is, the electronic device 800 is placed upside down).

If the front-side notification is not viable, the controller 810 may identify the type of event in operation 1007.

The controller 810 may identify the activation area of the display 831 according to the type of the identified event in operation 1009. The controller 810 may activate a portion of the display 831, which corresponds to the identified activation area in operation 1011. For example, as described in FIG. 6 and FIG. 7A, the controller 810 may activate a portion of the display 831 to correspond to the event. At this time, the light of the display 831 may be guided to at least one of the lateral side or the back side of the electronic device 800 through the light guide unit to then be output to the outside. The user may visually recognize the occurrence of the event through the light emitted from one of the lateral side and the back side.

Meanwhile, if the front-side notification is viable, the controller 810 may proceed to operation 1015 in order to thereby provide the front-side notification.

The controller 810 may determine whether or not the event has ended in operation 1013. If the event has not ended, the controller 810 may proceed to operation 1005 to repeat the operations above. Meanwhile, if the event has ended, the controller 810 may end the notification providing process.

The electronic devices described above, according to the embodiments of the present disclosure, may guide the light of the display to at least one of the lateral side or the back side to visually notify the user of the occurrence of the event when the front-side notification is unviable.

According to various embodiments, at least some of the devices (e.g., modules or functions thereof) or the method (e.g., operations) according to the present disclosure may be implemented by a command stored in a computer-readable storage medium in a programming module form. When the command is executed by one or more processors (e.g., the controller 810), the one or more processors may execute a function corresponding to the command At least some of the programming modules may be implemented (e.g., executed) by, for example, the processor. At least some of the programming modules may include, for example, a module, a program, a routine, and a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The various embodiments of the present disclosure disclosed in the present specification and the drawings have been presented to help comprehension of the present disclosure, and are not intended to limit the scope of various embodiments of the present disclosure. Therefore, it should be construed that, in addition to the embodiments disclosed herein, all modifications and changes or modified and changed forms derived from the technical idea of various embodiments of the present disclosure fall within the scope of the present disclosure.

What is claimed is:

1. A case for an electronic device having a lateral side, a back side, and a display configured to emit light, the case comprising:
   a body that is fastened to the electronic device; and
   a light guide unit comprising an optical waveguide and a light diffusing plate, the light guide unit being formed in the body,
   wherein the optical waveguide guides the light emitted from the display of the electronic device to at least one of the lateral side or the back side of the electronic device, and the light diffusing plate diffuses the light guided by the optical waveguide.

2. The case of claim 1, wherein a plurality of light guide units are formed.

3. The case of claim 1, wherein the light guide unit further comprises:
   a pattern layer that is positioned on the light diffusing plate, and allows the light emitted from the display to be output to the outside in a specific pattern.

4. The case of claim 3, wherein the pattern layer comprises a non-penetration area through which the light emitted from the display cannot pass, and a penetration area through which the light emitted from the display can pass.

5. The case of claim 3, further comprising a reflective plate that is formed on the light diffusing plate in order to reflect the light, which is emitted downwards, onto the light diffusing plate.

6. The case of claim 1, wherein the case for the electronic device comprises at least one of a flip-cover type of case, a front-side cover type of case, a back-side cover type of case, or a bumper type of case.

7. The case of claim 1, wherein the case comprises a flip cover that covers a front side of the electronic device and a battery cover that is integrally formed with the flip cover.

8. The case of claim 1, wherein optical waveguide guides light of a light-emitting unit to at least one of the lateral side or the back side of the electronic device, the light-emitting unit being formed on a front side of the electronic device.

9. An electronic device having a lateral side and a back side, the electronic device comprising:
   a display;
   at least one sensor configured to check a status of the electronic device;
   at least one processor configured to:
      determine, in response to detecting an event, by the at least one sensor whether or not a front-side notification of the electronic device is viable, and
      activate, if the front-side notification is unviable, at least a portion of the display to emit light; and
   a light guide unit comprising an optical waveguide and a light diffusing plate,
   wherein the optical waveguide guides the light emitted from the at least one portion of the display to at least one of the lateral side or the back side of the electronic device, and
   the light diffusing plate diffuses the light guided by the optical waveguide.

10. The electronic device of claim 9, wherein the light guide unit is formed on at least one of a battery cover or a flip cover that covers a front side of the electronic device.

11. The electronic device of claim 10, further comprising a light-emitting unit that is positioned on the front side of the electronic device,
   wherein the at least one processor is configured to activate the light-emitting unit in response to detecting the event, and
   wherein the optical waveguide guides the light of the light-emitting unit to at least one of the lateral side or the back side of the electronic device.

12. The electronic device of claim 9, wherein the at least one processor is configured to:
   identify a type of the event detected, and
   activate a portion of the display based on the type of the event identified.

13. The electronic device of claim 9, wherein the at least one processor is configured to:
   identify a type of the event detected, and
   activate a portion of the display in a color based on the type of the event identified.

14. A notification method of an electronic device having a lateral side and a back side, the method comprising:
   determining, in response to detecting an event, whether or not a front-side notification of the electronic device is viable; and
   activating, if the front-side notification is unviable, at least a portion of a display of the electronic device,
   wherein a light emitted from the portion of the display that has been activated is guided to at least one of the lateral side or the back side of the electronic device through a light guide unit of the electronic device to be output to the outside, and
   wherein the determining whether or not the front-side notification is viable comprises checking whether or not the electronic device is placed such that the display of the electronic device faces downwards.

15. The method of claim 14, further comprising, if the front-side notification is viable, displaying an icon or a pop-up window on the display in order to thereby provide the front-side notification.

16. The method of claim 14, wherein the activating of at least the portion of the display comprises identifying a type of the event detected and activating a portion of the display based on the type of the event identified.

17. The method of claim 14, wherein the activating of at least the portion of the display comprises: identifying a type of the event detected; and activating a portion of the display in a color based on the type of the event identified.

18. The method of claim 14, further comprising activating a light-emitting unit in response to detecting the event, the light-emitting unit being positioned on a front side of the electronic device,
   wherein light of the light-emitting unit that has been activated is guided to at least one of the lateral side or the back side of the electronic device through the light guide unit to be output to the outside.

* * * * *